US012800114B2

(12) United States Patent
Schuelke et al.

(10) Patent No.: US 12,800,114 B2
(45) Date of Patent: Nov. 17, 2026

(54) DISCHARGE SYSTEM

(71) Applicant: Robert Bosch GmbH, Stuttgart (DE)

(72) Inventors: Armin Schuelke, Aidlingen (DE); Olaf Ohlhafer, Erligheim (DE)

(73) Assignee: Robert Bosch GmbH, Stuttgart (DE)

( * ) Notice: Subject to any disclaimer, the term of this patent is extended or adjusted under 35 U.S.C. 154(b) by 486 days.

(21) Appl. No.: 18/579,996

(22) PCT Filed: Jun. 7, 2022

(86) PCT No.: PCT/EP2022/065357

§ 371 (c)(1),
(2) Date: Jan. 17, 2024

(87) PCT Pub. No.: WO2023/001443

PCT Pub. Date: Jan. 26, 2023

(65) Prior Publication Data

US 2024/0360963 A1 Oct. 31, 2024

(30) Foreign Application Priority Data

Jul. 23, 2021 (DE) ..................... 10 2021 207 904.0

(51) Int. Cl.
*F17C 13/12* (2006.01)
*B60K 15/03* (2006.01)
(Continued)

(52) U.S. Cl.
CPC ......... *F17C 13/12* (2013.01); *H01M 8/04111* (2013.01); *H01M 8/04201* (2013.01);
(Continued)

(58) Field of Classification Search
CPC .............. F17C 13/12; F17C 2205/0332; F17C 2270/01; F17C 1/00; H01M 8/04111;
(Continued)

(56) References Cited

U.S. PATENT DOCUMENTS 8,038,029 B2 10/2011 Lindner et al.
8,955,762 B2 2/2015 Pechtold
(Continued)

FOREIGN PATENT DOCUMENTS

CN 111799486 A 10/2020
DE 102012000096 A1 7/2012
(Continued)

OTHER PUBLICATIONS

Translation of International Search Report for Application No. PCT/EP2022/065357 dated Sep. 22, 2022 (2 pages).

*Primary Examiner* — Patrick C Williams
(74) *Attorney, Agent, or Firm* — Michael Best & Friedrich LLP

(57) ABSTRACT

The invention relates to a discharge system (41) for at least one pressure vessel (19) which is filled with a combustible fluid, said system being intended for releasing the combustible fluid from the at least one pressure vessel (19) into the surroundings once a predefined limit value of a release parameter has been exceeded, said system comprising: at least one drain valve (28) for releasing the fluid from the at least one pressure vessel (19) once the predefined limit value of the release parameter has been exceeded; at least one admission opening (30) for admitting the fluid from the at least one pressure vessel (19) into the at least one drain valve (28); and at least one drain opening (33) for releasing the fluid into the surroundings, wherein the discharge system (41) comprises at least one sensor (35) for detecting the ambient temperature and/or ambient radiation in the surroundings of the at least one drain opening (33), and the release of the fluid from the at least one drain opening (33) is controllable in an open loop and/or a closed loop on the basis of the ambient temperature and/or ambient radiation detected by the at least one sensor (35), also once the
(Continued)

predefined limit value of the release parameter has been exceeded.

16 Claims, 3 Drawing Sheets

(51) Int. Cl.

| | |
|---|---|
| ***H01M 8/04082*** | (2016.01) |
| ***H01M 8/04111*** | (2016.01) |
| ***H01M 8/0432*** | (2016.01) |
| ***H01M 8/04746*** | (2016.01) |

(52) U.S. Cl.

CPC ..... *H01M 8/0432* (2013.01); *H01M 8/04753* (2013.01); *B60K 15/03* (2013.01); *B60K 2015/03315* (2013.01); *F17C 2201/0119* (2013.01); *F17C 2201/056* (2013.01); *F17C 2203/0619* (2013.01); *F17C 2203/0639* (2013.01); *F17C 2203/0663* (2013.01); *F17C 2205/0111* (2013.01); *F17C 2205/0134* (2013.01); *F17C 2205/0326* (2013.01); *F17C 2205/0332* (2013.01); *F17C 2205/0394* (2013.01); *F17C 2221/012* (2013.01); *F17C 2221/033* (2013.01); *F17C 2223/036* (2013.01); *F17C 2250/032* (2013.01); *F17C 2250/0439* (2013.01); *F17C 2260/042* (2013.01); *F17C 2270/0178* (2013.01); *F17C 2270/0184* (2013.01); *H01M 2250/20* (2013.01)

(58) Field of Classification Search

CPC ........... H01M 8/04201; H01M 8/0432; H01M 8/04753

See application file for complete search history.

(56) References Cited

U.S. PATENT DOCUMENTS

| | | | | |
|---|---|---|---|---|
| 2007/0275272 | A1* | 11/2007 | Muramatsu | B60L 58/40 429/61 |
| 2009/0277515 | A1 | 11/2009 | Pechtold | |
| 2017/0059089 | A1* | 3/2017 | Uchida | F17C 5/06 |
| 2018/0026288 | A1* | 1/2018 | Yamanaka | H01M 8/04089 429/400 |
| 2022/0376275 | A1* | 11/2022 | Ozawa | H01M 8/04268 |

FOREIGN PATENT DOCUMENTS

| | | | |
|---|---|---|---|
| DE | 102013226913 | A1 | 6/2015 |
| DE | 102015015004 | A1 | 5/2017 |
| DE | 112007001582 | B4 | 10/2017 |
| DE | 102016220148 | A1 | 4/2018 |
| DE | 102020207253 | A1 | 12/2021 |
| DE | 102020207261 | A1 | 12/2021 |
| JP | 2004136828 | A | 5/2004 |
| JP | 2007106262 | A | 4/2007 |

* cited by examiner

DISCHARGE SYSTEM

BACKGROUND

The present invention relates to a discharge system for at least one pressure vessel filled with a combustible fluid, a pressure vessel system, a fuel cell system and a motor vehicle.

Fuel cell units acting as galvanic cells convert continuously supplied fuel and oxidizer into electrical energy by means of redox reactions on an anode and cathode. Fuel cells are used in a wide variety of stationary and mobile applications, e.g., in homes without connection to a power grid or in motor vehicles, rail transport, aviation, space travel, and marine applications. A large number of fuel cells are stacked in the fuel cell unit to form the fuel cell stack. Channels for passing fuel, channels for passing oxidizers and channels for passing coolant are integrated in the fuel cell stack. The fuel is stored in a compressed gas reservoir. Multiple compressed gas reservoirs are often combined as pressure vessels to form a pressure vessel system. In exceptional operating conditions, for example in the event of a fire in a motor vehicle, the fuel is always and immediately discharged from the pressure vessel system into the environment without further control in an open loop and/or a closed loop for safety reasons using a drain valve as a shut-off device as a TPRD (temperature pressure relief device) when a predefined limit value of a release parameter, for example a temperature of 200 or 300° C. at a pressure vessel, is exceeded. In motor vehicles with a fuel cell unit for powering the vehicle by means of electrical energy from the fuel cell unit, the hydrogen discharged during the exceptional operating conditions poses a high risk. Hydrogen burns with an invisible hydrogen flame. At high temperatures, a spark or another flame or an environment close to drain openings, there is a risk of the discharged hydrogen igniting and burning as a hydrogen flame. This poses a high risk of injury, especially for people in the vicinity of the vehicle, such as rescue workers.

DE 10 2012 000 096 A1 discloses a temperature/pressure relief device for a pressure vessel, comprising a temperature/pressure sensitive unit configured to relieve a pressure of the pressure vessel when a predetermined temperature and/or a predetermined pressure is exceeded.

U.S. Pat. No. 8,955,762 B2 discloses a drain valve as a TPRD (temperature pressure relief device) having a housing with an admission opening and a relief opening. A piston as a closing element is mounted in the housing. A spring is used to move the closing element from a closed position to an open position. An actuator changes its property, namely the volume of the actuator, depending on the temperature, so that the actuator can be used to activate the movement of the closing element from the closed position to the open position.

SUMMARY

A discharge system according to the invention for at least one pressure vessel which is filled with a combustible fluid, said system being intended for releasing the combustible fluid from the at least one pressure vessel into the surroundings once a predefined limit value of a release parameter has been exceeded, said system comprising: at least one drain valve for releasing the fluid from the at least one pressure vessel once the predefined limit value of the release parameter has been exceeded; at least one admission opening for admitting the fluid from the at least one pressure vessel into the at least one drain valve; and at least one drain opening for releasing the fluid into the surroundings, wherein preferably the discharge system comprises at least one sensor for detecting the ambient temperature and/or ambient radiation in the surroundings of the at least one drain opening, and the release of the fluid from the at least one drain opening is controllable in an open loop and/or a closed loop on the basis of the ambient temperature and/or ambient radiation detected by the at least one sensor, in particular from or when or while predefined limit value of the release parameter has been exceeded. To control in an open loop and/or a closed loop the release of the combustible fluid from the at least one pressure vessel, the ambient temperature and/or the ambient radiation for the release is thus also taken into account in order to avoid igniting the released fluid in the environment.

In a supplementary variant, the release of the fluid from at least one drain opening can be blocked as soon as at least one predefined limit value of the ambient temperature and/or ambient radiation in the vicinity of the at least one drain opening is exceeded, and preferably the predefined limit value of the ambient temperature and/or ambient radiation is assigned to one drain opening in each case.

In a further embodiment, when a predefined limit value of the ambient temperature and/or ambient radiation in the vicinity of a drain opening, in particular all drain openings, is exceeded, fluid can be released from one, in particular only one, drain opening and preferably the release from the other drain openings, in particular all other drain openings, can be blocked and preferably the only one drain opening is the drain opening with the minimum ambient temperature and/or minimum ambient radiation of all drain openings. This means, for example, that if the ambient temperature and/or ambient radiation in the vicinity of all drain openings (number of drain openings n) exceeds the predefined limit value, the fluid can be released from only one drain opening (number of drain openings 1), i.e. release from only one drain opening is not blocked and release from all other drain openings (number of drain openings n−1) is blocked. This ensures that even if the ambient temperature and/or ambient radiation in the vicinity of all drain openings exceeds the predefined limit value, the fluid can be drained from just one drain opening, for example to prevent a pressure vessel from exploding due to intense overpressure. Preferably, the ambient valves, in particular 3/2-way valves, are installed in the drain lines so that the fluid can be released from only one, in particular always identical, drain opening even when the motor vehicle is currentless. In this case, the only one, in particular always identical drain opening is preferably a drain opening, for example on the roof of a motor vehicle with a low hazard risk.

In a further variant, the fluid can only be released from the at least one drain opening once the predefined limit value of the release parameter has been exceeded, and the fluid can only be blocked from being released from the at least one drain opening while the predefined limit value of the release parameter is being exceeded if the limit value of the ambient temperature and/or ambient radiation in the vicinity of one drain opening in each case is exceeded. Preferably, the fluid can only be released from the at least one drain opening when the predefined limit value of the release parameter is exceeded, i.e. the basic prerequisite for the release is that the predefined limit value of the release parameter is exceeded as the first condition, but the actual release at one drain opening depends on the ambient temperature and/or ambient radiation as the second condition at this one drain opening, so that the actual release from the one drain opening can only be carried out if both conditions are met.

In an additional embodiment, the release of the fluid from the at least one drain opening can be blocked by means of at least one ambient valve once the predefined limit value of the ambient temperature and/or ambient radiation in the vicinity of the at least one drain opening has been exceeded.

An ambient valve is conveniently assigned to each drain opening.

In a supplementary configuration, the at least one ambient valve is an additional valve in addition to the drain valve.

Preferably, the discharge system comprises multiple drain openings and the ambient temperatures and/or ambient radiation at the drain openings can be detected separately.

In a further variant, the discharge system comprises multiple sensors for detecting the ambient temperature and/or ambient radiation in the vicinity of the at least one drain opening; in particular, at least one sensor for detecting the ambient temperature and/or ambient radiation in the vicinity of the at least one drain opening is assigned to each drain opening. Preferably, the at least one sensor for detecting the ambient temperature and/or ambient radiation in the vicinity of the respective drain opening, which is assigned to the respective drain opening, has a distance to the respective drain opening which is less than 30 cm, 20 cm, 10 cm or 5 cm.

In a further embodiment, the ambient temperatures and/or ambient radiation in the vicinity of multiple drain openings can be detected simultaneously and the greater the ambient temperature and/or ambient radiation at one drain opening, the smaller the volume flow of fluid that can be released from the drain opening and vice versa.

Advantageously, the ambient temperatures and/or ambient radiation in the vicinity of multiple drain openings can be detected simultaneously and, when the ambient temperature and/or ambient radiation in the vicinity of a respective drain opening exceeds the predefined limit value, the release of the fluid from the respective drain opening can be blocked and/or, when the ambient temperature and/or ambient radiation in the vicinity of a respective drain opening falls below the predefined limit value, the at least one ambient valve assigned to the respective drain opening is fully open and/or can be positioned in a fully open position, so that, in particular, the release of the fluid from the drain openings is controllable in an open loop and/or a closed loop by the ambient valves always being fully open or always being fully closed. If the ambient valve is fully closed, the fluid is blocked from flowing out of the drain opening assigned to this ambient valve.

A pressure vessel system according to the invention, comprising at least one pressure vessel for filling with a combustible fluid, a discharge system for the at least one pressure vessel which can be filled with the combustible fluid for releasing the combustible fluid from the at least one pressure vessel into the environment when a predefined limit value of the release parameter is exceeded, wherein the discharge system is designed as a discharge system described in this industrial property right application.

Fuel cell system according to the invention, in particular for a motor vehicle, comprising a fuel cell unit, a pressure vessel system with at least one pressure vessel for filling with a combustible fluid and a discharge system for the at least one pressure vessel which can be filled with the combustible fluid for releasing the combustible fluid from the at least one pressure vessel into the environment when a predefined limit value of the release parameter is exceeded, a gas conveying device for conveying a gaseous oxidizer to the cathodes of the fuel cells, wherein the pressure vessel system is designed as a pressure vessel system described in this industrial property right application.

Motor vehicle comprising a body, multiple wheels, a pressure vessel system comprising at least one pressure vessel for filling with a combustible fluid and a discharge system for the at least one pressure vessel which can be filled with the combustible fluid for releasing the combustible fluid from the at least one pressure vessel into the environment when a predefined limit value of the release parameter is exceeded, at least one conversion unit as a fuel cell unit and/or an internal combustion engine, which can be operated with the combustible fluid from the pressure vessel system, for converting electrochemical energy of the combustible fluid into electrical and/or mechanical energy, wherein the pressure vessel system is designed as a pressure vessel system described in this industrial property right application.

In particular, the release parameter for controlling in an open loop and/or a closed loop the at least one drain valve is the temperature of the fluid in the pressure vessel and/or the temperature of the at least one drain valve and/or the pressure of the fluid in the pressure vessel. Preferably, when the predefined limit value of the temperature and/or the predefined limit value of the pressure of the pressure vessel and/or the fluid in the pressure vessel and/or the temperature of the at least one drain valve is exceeded, it is thus possible to open the at least one drain valve so that the fluid can be released from the at least one drain opening. Preferably, the release parameter can be detected separately for each pressure vessel and the control in an open loop and/or a closed loop, in particular the opening, of the drain valve assigned to the respective pressure vessel takes place on the basis of the release parameter detected for this respective pressure vessel. Preferably, the release parameter comprises two partial release parameters, namely temperature and pressure.

In a further configuration, the at least one drain valve is connected to the at least one drain opening by at least one drain line in a fluid-conducting manner and the distance between the at least one drain valve and the at least one drain opening is greater than 0.1 m, 0.2 m, 0.5 m, 1 m or 2 m.

In a further variant, the drain openings, in particular all the drain openings, of the pressure vessel system are at least 2 m, 1 m, 0.5 m, 0.2 m or 0.1 m apart from one another on the motor vehicle.

In a further variant, the discharge system comprises at least one sensor for detecting the ambient temperature and/or ambient radiation in the vicinity of a respective drain opening and, on the basis of the ambient temperature and/or ambient radiation detected by the at least one sensor, the release of the fluid from the respective drain opening is controllable in an open loop and/or a closed loop even from or when or while the predefined limit value of the release parameter is exceeded.

In an additional embodiment, the ambient temperatures and/or ambient radiations in the vicinity of multiple drain openings can be detected simultaneously and the fluid can only be released from a drain opening with the lowest ambient temperature and/or lowest ambient radiation and the release of the fluid is blocked at every other at least one drain opening.

In a supplementary configuration, the release of the fluid from the respective drain opening is blocked as soon as a predefined limit value of the ambient temperature and/or ambient radiation in the vicinity of the respective drain opening is exceeded, and preferably the predefined limit value of the ambient temperature and/or ambient radiation is assigned to a respective drain opening.

In a further variant, the fluid can only be released from the at least one drain opening once the predefined limit value of the release parameter has been exceeded, and the fluid can only be blocked from being released from the respective drain opening while the predefined limit value of the release parameter is being exceeded if the limit value of the ambient temperature and/or ambient radiation in the vicinity of a respective drain opening is exceeded.

In an additional embodiment, the blocking of the fluid release from the respective drain opening can be blocked by means of the respective fully closed ambient valve once the ambient temperature and/or ambient radiation in the vicinity of the respective drain opening exceeds the predefined limit value.

In a further variant, the drain openings, in particular all the drain openings, of the pressure vessel system have a distance of at least 2 m, 1 m, 0.5 m, 0.2 m or 0.1 m from one another on the motor vehicle and/or the drain openings, in particular all the drain openings, of the pressure vessel system have different directions of release of the fluid from the drain openings, in particular the directions of release of the fluid from the drain openings differ by at least of the pressure vessel system have different directions of release of the fluid from the drain openings, in particular the directions of release of the fluid from the drain openings differ by at least 10°, 20°, 30°, 45°, 90° or 180°.

Conveniently, the at least one ambient valve is formed by the at least one drain valve, so that at least one valve are controllable in an open loop and/or a closed loop both on the basis of the at least one release parameter and on the basis of the ambient temperature and/or the ambient radiation.

In an additional configuration, the ambient temperature and/or the ambient radiation, in particular ambient heat radiation, in the vicinity of only one drain opening, which is assigned to the at least one sensor in each case, can essentially be detected with at least one sensor, and the control in an open loop and/or a closed loop of only one ambient valve, which is assigned to this only one drain opening, can be carried out by means of the data on the ambient temperature and/or ambient radiation detected by this at least one sensor in each case.

In a further configuration, at least one sensor, in particular multiple sensors, are designed to detect the ambient temperature and/or the ambient radiation in the vicinity of each drain opening.

In a supplementary variant, the at least one sensor for detecting the ambient temperature and/or ambient radiation in the vicinity of the at least one drain opening is a sensor for detecting the temperature and/or the infrared radiation and/or the ultraviolet radiation and/or a pyroelectric sensor and/or a thermal column and/or a thermal imaging camera and/or an ultraviolet radiation photo sensor and/or a sensor for detecting the thermal radiation and/or a flame detector and/or a sensor for detecting a hydrogen flame and/or a sensor for detecting two different radiation frequency ranges, in particular of infrared radiation and ultraviolet radiation, and/or a thermocouple and/or an ionization electrode in the vicinity of the at least one drain opening. An ionization electrode can detect a flame in the vicinity of the drain opening because the flame ionizes the air.

In a further embodiment, the environment that can be detected by the at least one sensor at each drain opening is at a distance of less than 10 m, 5 m, 2 m, 1 m, 0.5 m or 0.2 m from the respective drain opening, in particular in a direction of release of the fluid from the drain opening.

In an additional variant, the discharge system comprises a service valve.

Preferably, the service valve can be actively closed and opened, in particular by means of an electromagnet, and preferably on the basis of the operating condition of the fuel cell unit. During operation of the fuel cell unit, the service valve is therefore open and when the fuel cell unit is switched off, the service valve is closed.

In a supplementary embodiment, the fuel cell unit comprises a housing and/or a connection plate.

In a further variant, the fuel cell unit comprises at least one connection device, in particular multiple connection devices, and tensioning elements for pretensioning the fuel cell stack with a compressive force.

In a further configuration, the fuel cells each comprise a proton exchange membrane, an anode, a cathode, at least one gas diffusion layer and at least one bipolar plate.

In a further embodiment, the connecting device is designed as a bolt and/or is rod-shaped.

The tensioning elements are advantageously designed as clamping plates.

In a further variant, the gas conveying device is designed as a blower or a compressor.

Preferably, the fuel is hydrogen, hydrogen-rich gas, reformate gas, or natural gas.

Advantageously, the fuel cells and/or components are essentially flat and/or disk-shaped.

In a supplementary variant, the oxidizer is air with oxygen or pure oxygen.

Preferably, the fuel cell unit is a PEM fuel cell unit with PEM fuel cells.

BRIEF DESCRIPTION OF THE DRAWINGS

Embodiment examples of the invention are explained in greater detail below with reference to the accompanying drawings. The following are shown.

DETAILED DESCRIPTION

Figure 1:
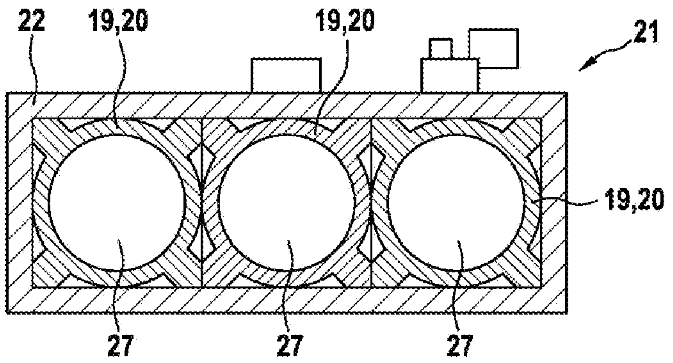
FIG. 1 a cross-section of a pressure vessel system with three pressure vessels, FIG. 2 a longitudinal section of the pressure vessel, FIG. 3 a highly simplified illustration of a fuel cell system with a fuel cell unit and a pressure vessel system with a discharge system and FIG. 4 a perspective view of a motor vehicle.
Figure 2:
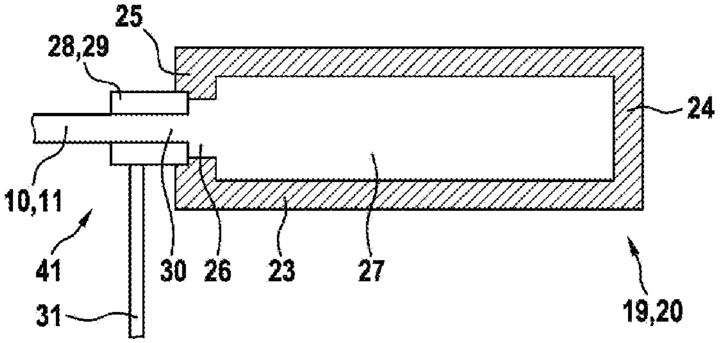

FIG. 1 shows a pressure vessel system 21 and FIG. 2 shows a longitudinal section of a pressure vessel 19 as a compressed gas reservoir 20. In the compressed gas reservoir 20, a fluid, namely the gas hydrogen as fuel, is stored under a pressure of approximately 400 to 800 bar in an interior 27 of the pressure vessel 19. The interior 27 is bounded by a cylindrical container side wall 23, a substantially disk-shaped rear wall 24 and a front wall 25, which is also substantially disk-shaped. The container side wall 23, the rear wall 24 and the front wall 25 are made of metal, in particular steel, or a fiber-reinforced plastic. An opening 26 is formed in the front wall 25. In the area of the opening 26 of the front wall 25, a drain valve 28 is attached as a TPRD 29 (temperature pressure relief device). The drain valve 28 has an admission opening 30 and the opening 26 of the front wall 25 opens into the admission opening 30. Furthermore, the drain valve 28 is connected to the front wall 25 in a fluid-tight manner. When only a predefined limit value of a release parameter of the drain valve 28 is exceeded, namely the release parameter of a predefined pressure of the fluid in the interior 27 and a predefined temperature of the drain valve 28, the drain valve 28 opens and drains the fluid from the interior 27 of the pressure vessel 19 through a drain line 31 to a drain opening 33 at one end of the drain line 31 into the environment. The drain valve 28 is connected to the front wall 25 of the pressure vessel 19 in a thermally conductive manner, so that the temperature of the fluid in the interior 27 essentially corresponds to the temperature of the drain valve 28. The predefined temperature of the release parameter is, for example, 120° C. or 200° C. and the predefined pressure of the release parameter at a maximum permissible operating pressure of the pressure vessel 19 of 800 bar is 850 bar. This means that if the maximum permissible operating pressure of the pressure vessel 19 is exceeded by 50 bar, the drain valve 28 is opened. In the pressure vessel system 21 shown in FIG. 1, 3 pressure vessels 19 are arranged and enclosed by an essentially rectangular housing 22.

Figure 3:
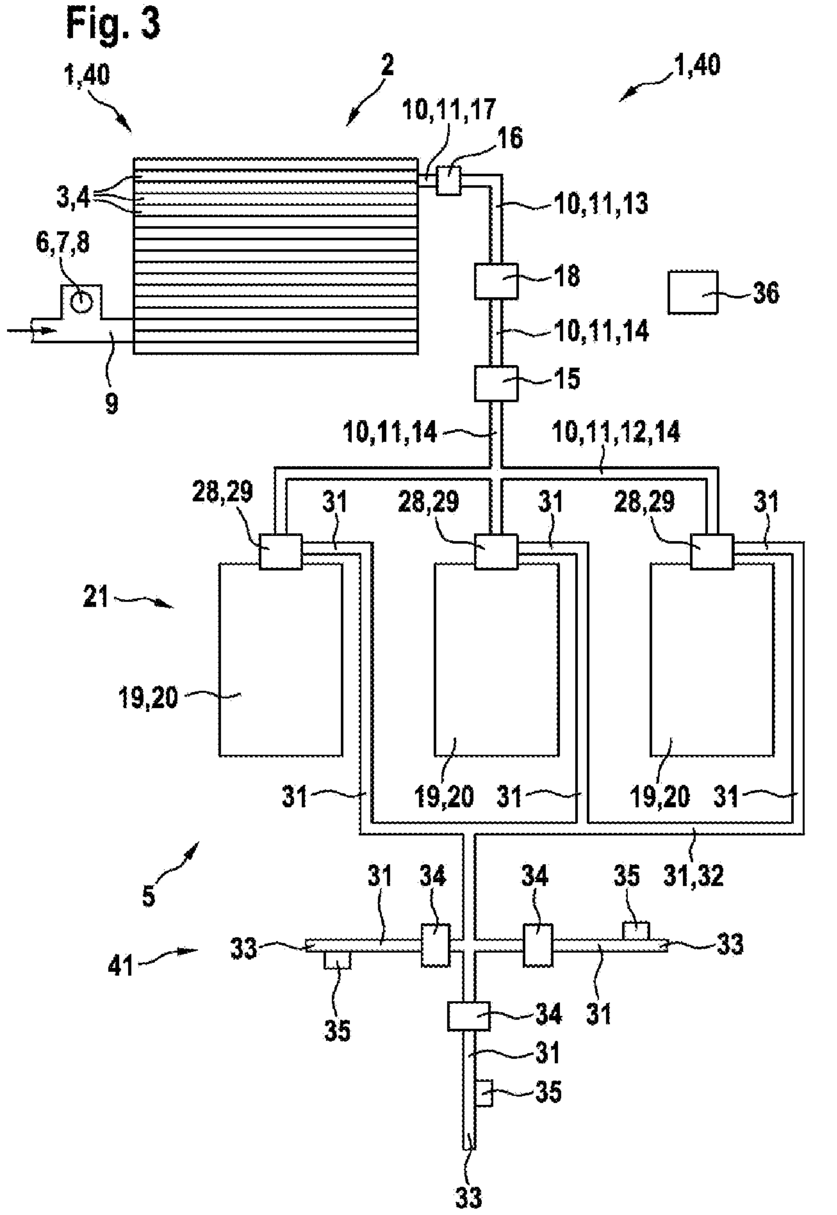

The drain valve 28 is also connected to a pressure line 10 as a fuel line 11 for releasing the fluid from the pressure vessel 19 for normal operation of a fuel cell unit 1 (FIG. 3). FIG. 3 shows a fuel cell system 5 with the pressure vessel system 21 and a fuel cell unit 1. The fuel cell unit 1 comprises a fuel cell stack 2 as a fuel cell stack 2 and the fuel cell stack 2 is enclosed by a non-illustrated housing and preferably a non-illustrated connection plate. A large number of fuel cells 3, namely PEM fuel cells 4, are stacked in the fuel cell stack 2. Due to the large number of stacked fuel cells 3 of approximately 300 to 400 fuel cells 3, these are not shown in FIG. 3 for reasons of simplification. In the fuel cell stack 2, there are channels for the hydrogen fuel to pass through, channels for the oxidizer, air, to pass through, and channels for the coolant to pass through. The hydrogen fuel is fed to the anodes and the oxidizer air is fed to the cathodes of the fuel cells 3. The oxidizer, air, is introduced from the ambient air into the fuel cell stack 2 via a supply line 9 and a gas conveying device 6, for example a blower 7 or a compressor 8.

The hydrogen fuel is fed from the pressure vessel system 21 into the fuel cell stack 2 through a supply line 17. The fuel line 11 connected to the drain valve 28 as pressure line 10 in each case at the pressure vessel 19 initially flow into a fuel line rail 12. From the fuel line rail 12, the fuel is fed from the 3 pressure vessels 19 through a high-pressure line 14 at a pressure of approximately 800 bar to an service valve 15 and from the service valve 15 through a further high-pressure line 14 to a pressure reducer 18. The service valve 15 only opens when the fuel cell unit 1 is in operation and the service valve 15 is closed when the fuel cell unit 1 is switched off.

In the pressure reducer 18, the pressure of the fuel in a medium-pressure line 13 is reduced by approximately 10 bar to 20 bar. The fuel is fed from the medium pressure line 13 to an injector 16 or a metering valve 16. At the injector 16, the pressure of the fuel is reduced to an injection pressure of between 1 bar and 3 bar. The fuel is supplied from the injector 16 to the fuel supply line 17 (FIG. 3) and from the supply line 17 to the fuel channels of the fuel cell stack 2.

The drain valves 28 on the pressure vessels 19 are connected by drain lines 31 to a common drain rail 32 in a fluid-conducting manner. Three separate drain lines 31 branch off from the common drain rail 32 and the three separate drain lines 31 each end in a drain opening 33. The fuel cell system 5 with the discharge system 41 thus comprises 3 drain openings 33. An ambient valve 34 is arranged in each of the drain lines 31, which only open into one drain opening 33. With the ambient valve 34, the release of the fuel through only one drain opening 33 can be fully blocked by fully closing the ambient valve 34. The ambient valves 34 can each be opened and closed separately, i.e. one ambient valve 34 or two or three ambient valves can be open, for example. In the vicinity or in the area of the drain opening 33, for example at a distance of less than 30 cm, 20 cm, 10 cm or 5 cm from the drain opening 33, a sensor 35 is arranged for detecting the temperature and the radiation in the vicinity of the drain opening 33. The data recorded by the sensors 35 are transmitted to an open loop and/or a closed loop control unit 36 via a data conductor not shown. The control in an open loop and/or a closed loop of the ambient valve 34 takes place on the basis of the data recorded by the sensors 35, i.e. when a predefined limit value of the ambient temperature and/or the ambient radiation in the environment is exceeded at a respective drain opening 33, the ambient valve 34 assigned to this drain opening 33 is closed and otherwise, i.e. when the ambient temperature and/or the ambient radiation in the environment falls below a predefined limit value at a respective drain opening 33, it is opened, so that, if at least one drain valve is open as a further condition, the fluid is actually released. Deviating from this, the discharge system 41 could also be used for controlled release of the fluid from at least one drain opening 33 without exceeding the limit value of the release parameter, for example in a service case in a workshop. The discharge system 41 thus comprises the drain valves 28, the sensors 35, the ambient valves 34 and the drain lines 31.

Figure 4:
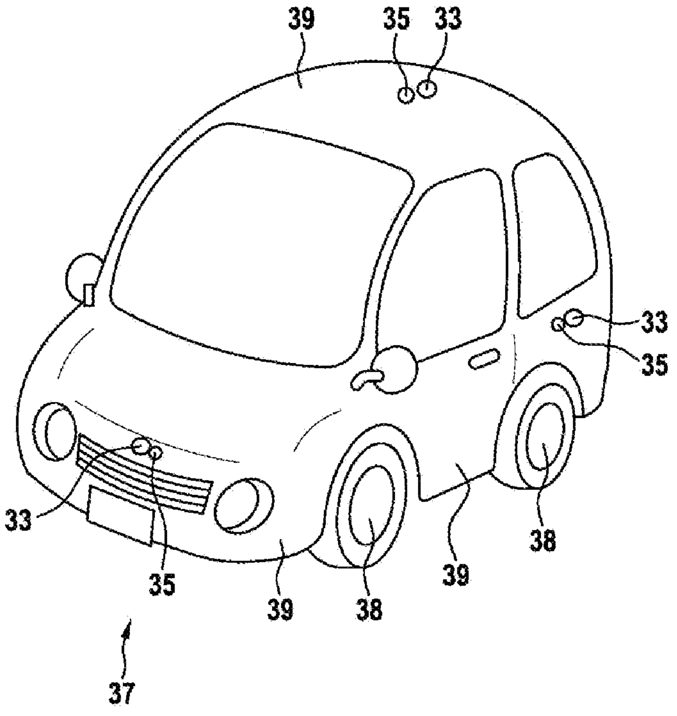

A motor vehicle 37 shown in FIG. 4, for example a passenger car or truck, comprises a body 39 and 4 wheels 38. The fuel cell system 5 shown in FIG. 3 with the fuel cell unit 1 and the pressure vessel system 21 is installed in the motor vehicle 37. The pressure vessel system 21 also comprises the discharge system 41. The fuel cell unit 1 converts the electrochemical energy present in the hydrogen fuel into electrical energy. The electrical energy as electrical current, which is generated by the fuel cell unit 1, is used in the motor vehicle 37 in particular to supply electrical energy to a drive motor as a traction electric motor for traction and for driving the motor vehicle 37.

The pressure vessel system 21 is attached underneath the body 39 of the motor vehicle 37. In certain operating conditions, for example in the event of an accident and/or a fire under the body 39 of the motor vehicle 37, it is necessary for safety reasons to immediately discharge the fuel in the pressure vessel 19 into the environment in a short time. A hydrogen flame does not burn visibly, so that objects in the vicinity of the drain opening 33 with a high temperature, sparks or flames already present in the vicinity of the drain opening 33 could ignite the hydrogen discharged from the drain opening 33, so that the dangerous invisible hydrogen flame would be created. To avoid this, the sensors 35 are used to detect the ambient temperature and the ambient radiation, in particular the ambient heat radiation, in the area, i.e. in the vicinity of the drain openings 33, and if a limit value is exceeded at one drain opening 33 in each case, the ambient valve 34 assigned to this drain opening 33 is closed by the open loop and/or a closed loop control unit 36. Thus, the fuel is released from the pressure vessels 19 in the special operating conditions only at that at least one drain opening 33 which does not exceed the limit value and thus there is also no risk of ignition of the fuel discharged from the drain opening 33.

In a further embodiment example not shown, the drain valve 28 and the ambient valve 34 are formed by only one valve. In the following, essentially only the differences to the embodiment example shown in FIG. 3 are described. Sensors for detecting the pressure and temperature of the fluid in the pressure vessels 19 are arranged on the pressure vessels 19. The valves on the pressure vessels 19 open into only one drain line 31 and this into only one drain opening 33. By means of the open loop and/or a closed loop control unit 36, these 3 valves on the 3 pressure vessels 19 are only opened if both the limit value of the release parameter in the respective pressure vessel 19 is exceeded and, in addition, the predefined limit value of the ambient temperature and/or the ambient radiation, which is detected by the sensor 35, is not exceeded.

In a further embodiment example not shown, the pressure vessel system 21 comprises only one drain opening 33 and only one sensor 35. In the following, essentially only the differences to the embodiment example shown in FIG. 3 are described. The release of the combustible fluid as the fuel hydrogen from the only one drain opening 33 is thus only carried out, even if the predefined limit value of the release parameter is exceeded, if the limit value of the ambient temperature and/or the ambient radiation detected by the only one sensor 35 is not exceeded at the only one drain opening 33.

Overall, there are significant advantages associated with the discharge system 41 according to the invention, the pressure vessel system 21 according to the invention, the fuel cell system 5 according to the invention and the motor vehicle 37 according to the invention. In special operating conditions, in particular in the event of an accident or a fire, the fuel must be released from the pressure vessel 19 into the environment in a short time. Due to the detection of the ambient temperature and/or the ambient radiation in the vicinity of the drain openings 33 with the sensors 35, the fuel is only discharged into the environment at those drain openings 33 where there is no risk of the discharged fuel igniting into a dangerous hydrogen flame. This can significantly improve operational safety when using the discharge system 41 and the pressure vessel system 21 in the motor vehicle 37. Hydrogen flames are not optically visible and therefore represent a significant danger, particularly for rescue workers, in the event of an accident involving the motor vehicle 37, so that the motor vehicle 37 according to the invention significantly increases safety in the event of an accident.

The invention claimed is:

1. A discharge system (41) for at least one pressure vessel (19) filled with a combustible fluid, for releasing the combustible fluid from the at least one pressure vessel (19) into an environment when a predefined limit value of a release parameter is exceeded, the discharge system (41) comprising:

at least one drain valve (28) for releasing the fluid from the at least one pressure vessel (19) when the predefined limit value of the release parameter is exceeded, at least one admission opening (30) for introducing the fluid from the at least one pressure vessel (19) into the at least one drain valve (28), at least one drain opening (33) for releasing the fluid into the environment, wherein the discharge system (41) comprises at least one sensor (35) for detecting an ambient temperature and/or ambient radiation in a vicinity of the at least one drain opening (33) and, based on the ambient temperature and/or ambient radiation detected by the at least one sensor (35), the release of the fluid from the at least one drain opening (33) is controllable in an open loop and/or a closed loop even after the predefined limit value of the release parameter is exceeded.

2. The discharge system according to claim 1, wherein the release of the fluid from at least one drain opening (33) can be blocked as soon as at least one predefined limit value of the ambient temperature and/or ambient radiation in the vicinity of the at least one drain opening (33) is exceeded.

3. The discharge system according to claim 1, wherein when a predefined limit value of the ambient temperature and/or ambient radiation in the vicinity of a drain opening (33) of the at least one drain opening (33) is exceeded, fluid can be released from one, in particular only one, drain opening (33) of the at least one drain opening (33) and release from other drain openings (33) of the at least one drain opening (33) can be blocked.

4. The discharge system according to claim 1, wherein the fluid can only be released from the at least one drain opening (33) once the predefined limit value of the release parameter has been exceeded, and the fluid can only be blocked from being released from the at least one drain opening (33) while the predefined limit value of the release parameter is being exceeded if the limit value of the ambient temperature and/or ambient radiation in the vicinity of one drain opening (33) in each case is exceeded.

5. The discharge system according to claim 1, wherein the release of the fluid from the at least one drain opening (33) can be blocked by at least one ambient valve once the predefined limit value of the ambient temperature and/or ambient radiation (34) in the vicinity of the at least one drain opening (33) has been exceeded.

6. The discharge system according to claim 5, wherein an ambient valve (34) is assigned to each drain opening (33).

7. The discharge system according to claim 5, wherein the at least one ambient valve (34) is an additional valve (34) in addition to the at least one drain valve (28).

8. The discharge system according to claim 5, wherein the ambient temperatures and/or ambient radiations in the vicinity of multiple drain openings (33) can be detected simultaneously and, when the ambient temperature and/or ambient radiation in the vicinity of a respective drain opening (33) exceeds the predefined limit value, the release of the fluid from the respective drain opening (33) can be blocked and/or, when the ambient temperature and/or ambient radiation in the vicinity of a respective drain opening (33) falls below the predefined limit value, the at least one ambient valve (34) assigned to the respective drain opening (33) is fully opened.

9. The discharge system according to claim 1, wherein the discharge system (41) comprises multiple drain openings (33) and the ambient temperatures and/or ambient radiation at the drain openings (33) can be detected separately.

10. The discharge system according to claim 1, wherein the discharge system (41) comprises multiple sensors (35) for detecting the ambient temperature and/or ambient radiation in the vicinity of the at least one drain opening (33).

11. The discharge system according to claim 10, wherein at least one sensor (35) for detecting the ambient temperature and/or ambient radiation in the vicinity of the at least one drain opening (33) is assigned to each drain opening (33).

12. The discharge system according to claim 1, wherein the ambient temperatures and/or ambient radiation in the vicinity of multiple drain openings (33) can be detected simultaneously and the greater the ambient temperature and/or ambient radiation at one drain opening (33), the smaller a volume flow of fluid that can be released from the drain opening (33) and vice versa.

13. A pressure vessel system (21) comprising:

at least one pressure vessel (19) for filling with a combustible fluid, a discharge system (41) for the pressure vessel (19) filled with the combustible fluid, for releasing the combustible fluid from the at least one pressure vessel (19) into an environment when a predefined limit value of the release parameter is exceeded, wherein the discharge system (41) is configured according to claim 1.

14. A fuel cell system (4) comprising:

a fuel cell unit (1), a pressure vessel system (21) with at least one pressure vessel (19) for filling with a combustible fluid and a discharge system (41) for the pressure vessel (19) filled with the combustible fluid, for releasing the combustible fluid from the at least one pressure vessel (19) into an environment when a predefined limit value of the release parameter is exceeded, a gas conveying device (6) for conveying a gaseous oxidizer to cathodes of the fuel cells (2, 3), wherein the pressure vessel system (21) is configured according to claim 13.

15. A motor vehicle (37), comprising a body (39), multiple wheels (38), a pressure vessel system (21) comprising at least one pressure vessel (19) for filling with a combustible fluid and a discharge system (41) for the pressure vessel (19) filled with the combustible fluid, for releasing the combustible fluid from the at least one pressure vessel (19) into an environment when a predefined limit value of the release parameter is exceeded, at least one conversion unit (40) as a fuel cell unit (1) and/or an internal combustion engine, which can be operated with the combustible fluid from the pressure vessel system (21), for converting electrochemical energy of the combustible fluid into electrical and/or mechanical energy, wherein the pressure vessel system (21) is configured according to claim 13.

16. The motor vehicle according to claim 15, wherein the drain openings (33) of the pressure vessel system (21) are at least 2 m, 1 m, 0.5 m, 0.2 m or 0.1 m apart from one another on the motor vehicle (37).

* * * * *